June 23, 1959 W. P. OEHLER ET AL 2,891,460
POWER LIFT EQUALIZER MEANS
Filed Aug. 31, 1956 4 Sheets-Sheet 1

INVENTORS
WILLIAM P. OEHLER
LESLIE W. JOHNSON
BY
ATTORNEYS

June 23, 1959 W. P. OEHLER ET AL 2,891,460
POWER LIFT EQUALIZER MEANS
Filed Aug. 31, 1956 4 Sheets—Sheet 2

INVENTORS.
WILLIAM P. OEHLER
LESLIE W. JOHNSON
BY
C. T. Parker + R. C. Johnson
ATTORNEYS

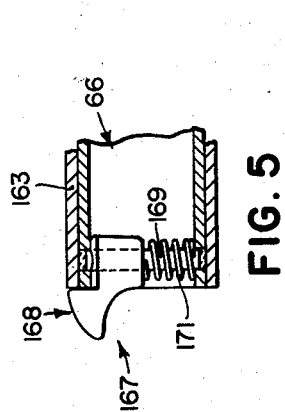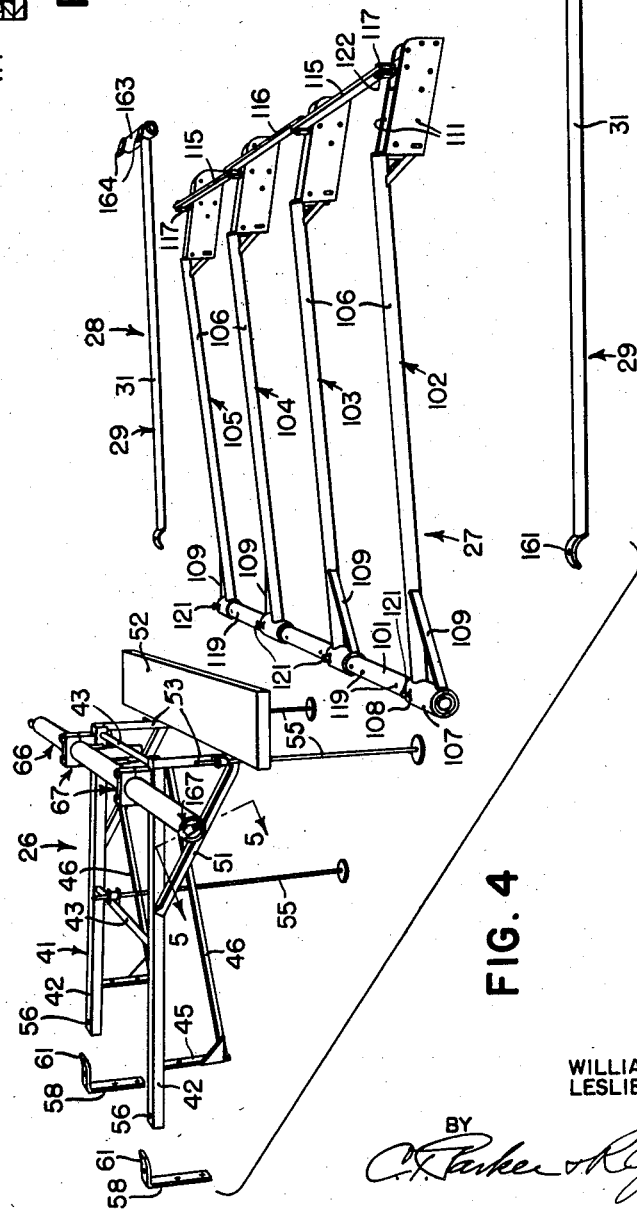

United States Patent Office 2,891,460
Patented June 23, 1959

2,891,460

POWER LIFT EQUALIZER MEANS

William P. Oehler and Leslie W. Johnson, Moline, Ill., assignors, by mesne assignments, to Deere & Company, a corporation of Delaware Application August 31, 1956, Serial No. 607,427

2 Claims. (Cl. 172—488)

This application is a continuation-in-part of our copending application, Ser. No. 363,784, filed June 24, 1953 for Tractor-Mounted Planter and issued October 14, 1958 as Patent No. 2,855,875.

The present invention relates generally to agricultural implements and more particularly to implements of the type that are adapted to be mounted directly on a tractor.

The object and general nature of the present invention is the provision of a four-row planter or other similar implement adapted to be mounted on the rear of a conventional farm tractor, the arrangement and connections being such that the attachment of the implement to the tractor and its disconnection therefrom are materially facilitated whereby it is a relatively simple matter during the planting or operating season to quickly disconnect the implement and thereby release the tractor for other uses.

More specifically, it is a feature of this invention to provide a four-row tractor-mounted implement in the nature of a planter, so constructed and arranged that the laterally inner seed and fertilizer hopper units are carried directly on the tractor while the laterally outer units are supported on the transversely extended rockshaft by which all four furrow openers are raised and lowered.

It is also a feature of this invention, particularly important in four-row implements generally, to provide lifting means whereby the ground-engaging parts of the implement may be raised and lowered without overstressing the power lift parts of the tractor.

These and other objects and advantages of the present invention will be apparent to those skilled in the art after a consideration of the following detailed description of one preferred embodiment, taken in conjunction with the accompanying drawings in which said embodiment is shown for purposes of illustration.

In the drawings:

Fig. 4 is a fragmentary perspective view illustrating the several implement components in their separated relation, showing them in the positions they may occupy when disconnected from the tractor to permit the latter to be applied to other uses.

Fig. 5 is a fragmentary detail view of the latching means associated with the transverse rockshaft for holding the detachable members for the laterally outer units in attached relation.

Figure 1:
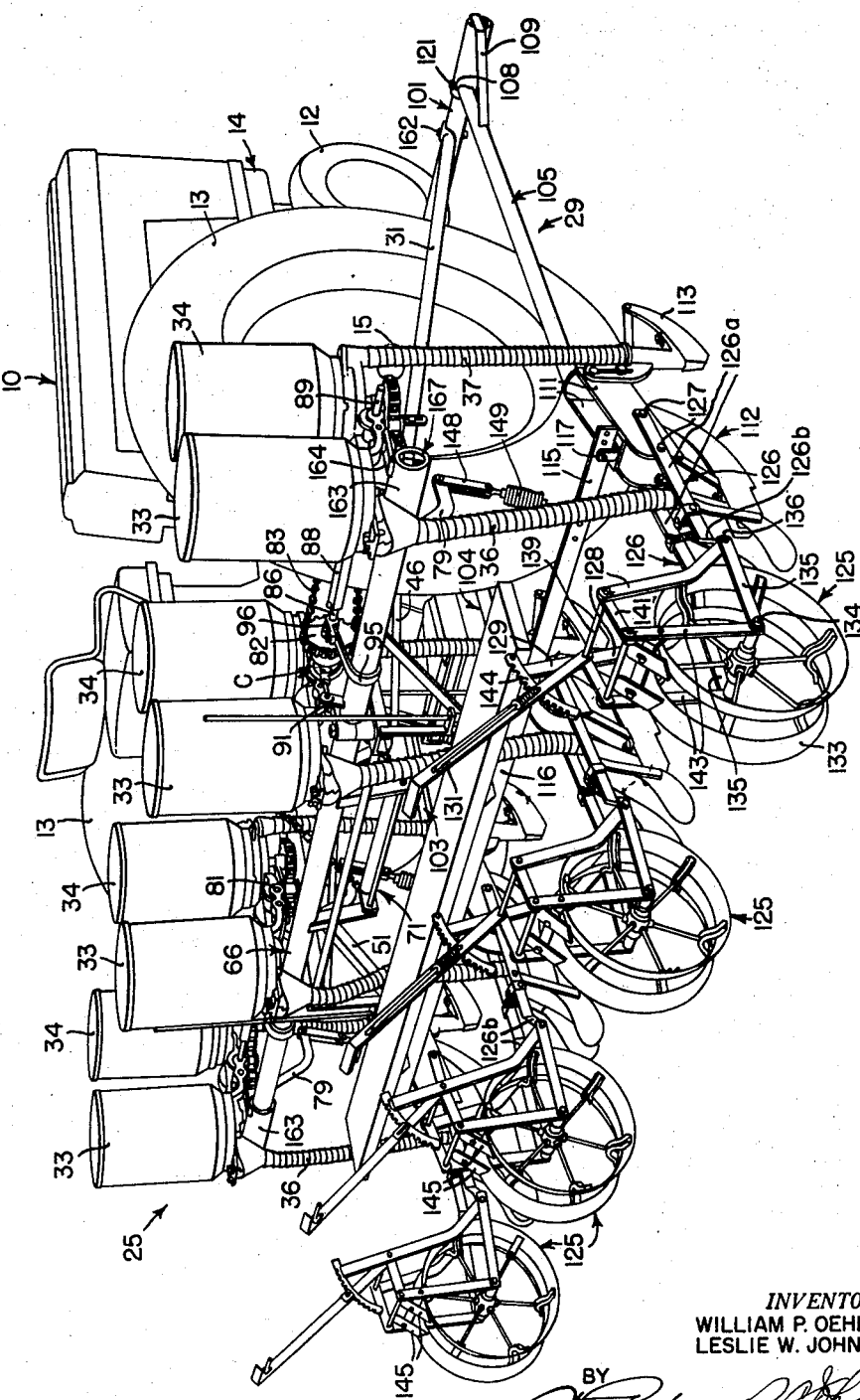
Fig. 1 is a rear quartering perspective view showing the principles of the present invention as incorporated in a tractor-mounted four-row planter.

The four-row tractor-mounted planter chosen to illustrate the principles of the present invention is shown as mounted on a conventional farm tractor 10 of the row-crop or tricycle type. The tractor includes closely spaced front wheels 12 and a pair of laterally spaced apart rear drive wheels 13 upon which the main frame 14 of the tractor is supported. The drive wheels 13 are fixed to the laterally outer ends of transversely extending axle shafts 15 that are supported for rotation in a rear axle structure 16. The tractor 10 is provided with a power lift unit 17, conventional so far as the present invention is concerned, the power lift unit being of the type that includes a transverse rockshaft 18 to the ends of which lift arms 19 are connected. Suitable means (not shown) is provided for operating and controlling the tractor power lift unit 17.

The implement, in which the present invention has been incorporated, is shown as a four-row planter 25. The implement 25 comprises three implement components 26, 27, and 28. The implement component 26 is a main frame detachably connected with the tractor at its rear end, the implement component 27 may be considered the furrow opener component, and the third component 28 is a pair of detachable units 29, each of which includes an outer hopper support and brace 31 and other parts to be described in detail later. The implement 25 is a four-row machine and includes four sets of seed and fertilizer hoppers, indicated at 33 and 34. These parts are generally conventional and need not be described in detail except to say that each includes, in the hopper bottom thereof, suitable dispensing means whereby seed from the seed hoppers 33 is controllably dispensed through seed tubes 36 and fertilizer from the fertilizer hoppers 34 is dispensed through associated fertilizer tubes 37. These seed and fertilizer tubes are flexible members and accommodate up-and-down movement of the associated furrow openers which will be referred to in detail later.

Figure 2:
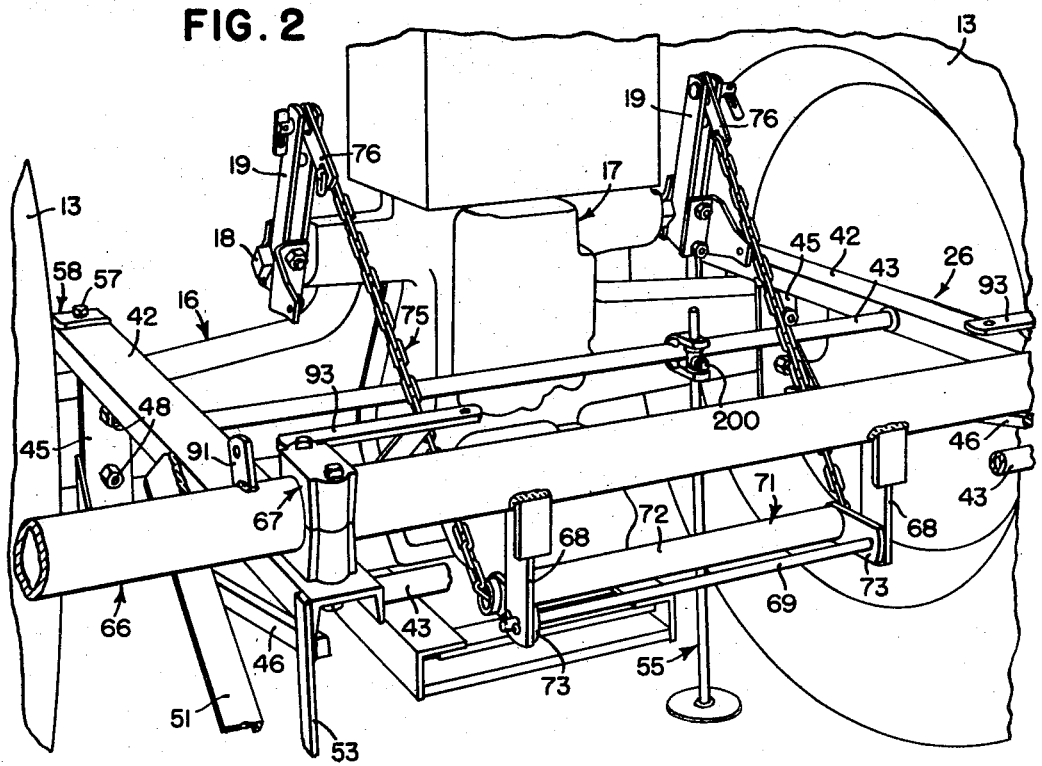
Fig. 2 is a fragmentary perspective view showing the main implement frame and one of the two associated supports for the power lift operated lifting rockshaft, the hopper and drive details being omitted for purposes of clarity.

Referring now more particularly to Figs. 2 and 4, the main implement frame component 26 comprises a main frame structure 41 that is made up of a pair of fore-and-aft extending members, preferably in the form of channels 42 suitably and rigidly interconnected by means including a pair of crossbars 43 the ends of which are welded or otherwise securely fixed to the members 42. Depending struts 45 are fixed at their upper ends to the forward end portions of the members 42 and these struts are reenforced by diagonal brace bars 46 extending rearwardly and upwardly from the lower ends of the struts 45 to the rear end portions of the generally horizontal brace bars 46. The struts 45 are apertured to receive the attaching studs 48, which form a part of the tractor 10. The rear ends of a pair of rear diagonal brace bars 51 are extended rearwardly a distance sufficient to receive and support a foot board 52, the diagonal bars 51 being welded at their front ends to the frame members 42 and connected to the ends of the latter bars by generally vertically extending struts 53. The latter members, together with the forward crossbar 43, carry suitable adjustable clamps by which supporting stands 55 may be carried and which, when the frame unit 26 is detached from the tractor, supports the latter in elevated position relative to the ground surface and in a position to facilitate reconnection of the tractor therewith. The forward ends of the frame members 42 are apertured, as at 56, to receive studs 57 or the like that serve to connect the forwardmost ends of the frame members 42 to a pair of tie members 58 that are normally permanently attached to the rear axle 16 of the tractor, at the forward sides thereof. Usually, the tie members are retained on the tractor, since they do not ordinarily interfere with other implements. The tie members 58 are fastened to the forward side of the rear axle structure 16 by studs that generally are similar to the studs 48 (Fig. 2). The upper rearwardly extending portions of the members 58 are bent upwardly and rearwardly, as indicated at 61, to serve as guiding means when backing the tractor into position to receive the main implement frame component 26.

The frame structure 41 serves as supporting means for a relatively large transversely extending lift rockshaft in the form of a pipe 66. As will be seen from Fig. 1, this member is disposed transversely of the tractor and extends laterally outwardly thereof at the rear of the tractor beyond and rearwardly of the rear drive wheels 13. The pipe 66 is rockably supported on the frame 41, substantially at the rear portion thereof, by a pair of supports 67 of the split bearing type. A pair of arms 68 are fixed to the generally central portion of the pipe or rockshaft 66 and at their lower ends are apertured to receive a cross pin 69 that connects a swingable yoke 71 to the arms 68. The yoke 71 comprises a relatively smooth tube 72 and end bars 73 which are pivotally mounted on the pin 69. The forward ends of the bars 73 are secured, as by welding, to the ends of the tube 72, and laterally outwardly of the bars 73 the tube 72 is flared to provide for relatively free movement of a lifting chain 75 that extends through the tube 72 and has its ends connected by link members 76 with the outer or upper ends of the lift arms 19, which form a part of the tractor power lift structure. The tube 72, through which the chain is movable, and the chain 75 form an equalizing or evener bar structure by which the effort exerted to actuate the lifting rockshaft 66 is divided substantially equally between the two lift arms 19 and associated parts, and as a result of this arrangement torsional strains in the power lift rockshaft 18 are materially reduced over what they would be if, for example, all of the lifting effort were even momentarily imposed on only one of the lift arms 19. The transverse rockshaft 66 is provided with four arms 79 (Fig. 1) rigidly secured to the rockshaft 66, as by welding, each arm including a downwardly and forwardly disposed portion connected with the associated furrow openers that are described in detail below.

As mentioned above, the main frame 41 carries the laterally inner seed and fertilizer hoppers and associated parts. Preferably, but not necessarily, these laterally inner units are bolted directly to the frame members 42. Each of the laterally inner sets of hoppers includes a transverse drive shaft 81 that at its laterally outer end is driven by a sprocket 82 and associated clutch mechanism, each sprocket 82 being driven by a chain 83 from a sprocket (not shown) on the associated drive wheel. Each of the drive shafts 81 is extended, as at 86, and formed with a non-circular portion with which a tubular shaft 88 is slidingly connected. The shaft or tubular member 88 thus serves to connect the associated shaft 81 with a similar drive shaft 89 of the associated laterally outer hopper unit. Each shaft section 88 is separable from the associated laterally inner shaft section 81 merely by sliding the tubular shaft 88 off the laterally outer end of the associated shaft 81. Suitable automatic clutch means is provided for connecting and disconnecting each sprocket 82 from the associated shaft, the details of the clutch mechanism not forming any particular part of the present invention except insofar as the clutches are automatically controlled by rocking movement of the lifting rockshaft 66 through actuating arms 91. If desired, brackets 93 may be provided on each of the members 42, adjacent the rockshaft 66, for supporting the associated hopper units. In order to relieve the telescopic shaft sections 86, 88 of unnecessary stresses, due to the pull of the driving chains 83, a pair of shaft supports 95 may be provided, each having a forward bearing member 96 receiving the associated drill shaft 86, and the rear end of each of the members 95 is curved or otherwise formed so as to snugly embrace the rockshaft 66. The latter member therefore sustains substantially all of the fore-and-aft directed forces imposed on the shaft sections 86 and associated parts.

The implement component 27 comprises a furrow opener frame unit that includes a front member in the form of a tube or pipe 101 and four rearwardly extending drawbars 102, 103, 104 and 105. These drawbars are substantially identical except drawbars 102 and 103 are left-hand parts while drawbars 104 and 105 are right-hand parts. Each of the drawbars 102–105 includes a generally fore-and-aft extending pipe member 106 to the forward end of which is secured a cross sleeve 107 slotted, as at 108. Each cross sleeve 107 is reenforced by a brace 109, and to the rear end of each of the pipe members 106 is a pair of runner frame plates 111 to each pair of which a furrow opener in the form of a runner 112 is secured, as best shown in Fig. 1. Also secured to one of the plates 111 of each pair of plates is a fertilizer furrow opener 113, the latter receiving the lower end of the fertilizer dispensing pipe or tube 37 and each runner 112 receiving the lower end of the seed tube 36. The rear ends of the drawbars are held apart in the desired lateral spacing by spacer bars 115 and 116 that are pivotally connected to pivot brackets 117, one of which is connected to each pair of runner frame plates 111.

To provide for various row spacings, each of the drawbars 102—105 is adjustable laterally on the associated front pipe member 101, and to this end the latter is provided with a plurality of openings 119 any one of which is adapted to receive the associated pin 121, there being one pin 121 and associated plurality of openings 119 for each of the drawbars 102—105, the pins 121 extending through the slots 108 in each of the transverse sleeves 107, the slots providing for independent generally vertical swinging movement of the several drawbars. To accommodate different row spacings, each of the rear spacer bars 115 and 116 is also provided with a plurality of openings to selectively receive the associated pivot pin 122.

As will be seen from Fig. 1, connected to the rear end of each of the drawbars 102—105 is an adjustable press wheel unit, indicated in its entirety by the reference numeral 125. Each press wheel unit 125 includes a pair of generally L-shaped frame bars 126 each of which includes a generally fore-and-aft extending part 126a that is connected, as by bolts 127, to the associated plates 111 and rigidly interconnected, generally vertically extending rear section 128, one of which is extended upwardly, as at 129, to receive a hand lever 131. Preferably, each vertical section 128 is integral with the associated fore-and-aft extending part. The press wheel 133 of each unit is mounted for rotation on an axle 134 that is carried at the rear ends of a pair of lower links 135. The forward ends of each pair of links 135 are apertured to receive pivot bolts 136 that are carried by the frame members 126 adjacent the juncture between the frame sections 128 and the respectively associated forwardly extending sections that are bolted to the runner frame plates 111. The upper ends of the press wheel frame sections 128 are apertured to receive a shaft 139 to which the lower end of the hand lever 131 is fixed. Also fixed to the shaft 139 is a pair of rearwardly extending arms 141, the rear ends of which are pivotally connected with the upper portion of a pair of supporting bars 143. The upper arms 141 are generally parallel to the lower arms or links 135, and therefore when the hand lever 131 is unlatched from the associated sector 144 that is fixed to the frame bar extension 129, rocking the hand lever 131 in one direction or the other serves to raise and lower the associated press wheel 133 relative to the associated runner opener 112 and fertilizer furrow opener 113. The upper ends of the supporting bars 143 carry press wheel scraper means 145, of conventional construction so far as the present invention is concerned. For raising all of the furrow opener and press wheel units into a transport position, out of engagement with the ground, suitable connections are made between the spacer bars 115 and 116, and the four lifting arms 79 on the lifting rockshaft 66. Preferably, each of said connections includes an upper link 148 and a lower cushioning spring member 149. The principal function of the cushioning springs 149 is to prevent the transmission of shock loads to the lifting rockshaft 69 when, during transport, the outfit traverses rough or uneven ground.

Figure 3:
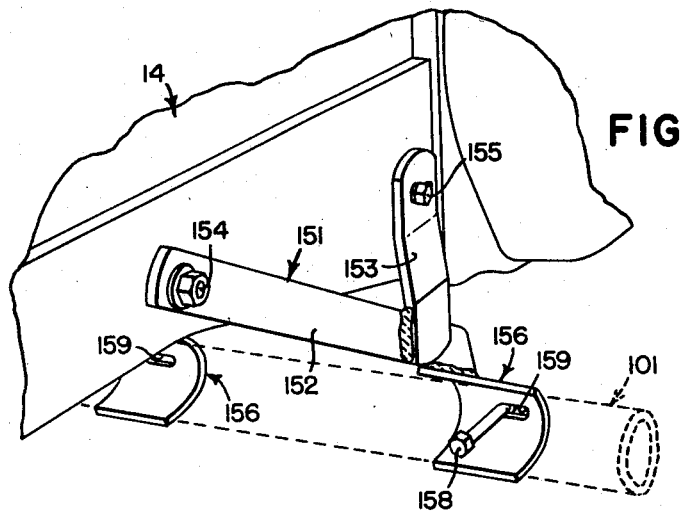
Fig. 3 is a fragmentary perspective detail view showing the draft support for the transverse draft bar to which the furrow openers are connected.

The front pipe member 101 is adapted to be connected in draft-transmitting relation with the generally central portion of the tractor, forward of the rear wheels 13 thereof, by means best shown in Fig. 3. Referring now to this figure, fastened to each side of the tractor is a bracket or hanger 151 that is made up of a pair of bars 152 and 153 that are apertured at their upper ends to receive studs 154 and 155 that rigidly connect the bracket 151 to the tractor. The bars 152 and 153 are joined together, as by welding, at their lower ends and receive and support an associated generally semicircular socket member 156. The curved or socket portion of the member 156 faces forwardly and has a radius of curvature that corresponds to the radius of the front pipe member 101. The latter is apertured to receive a pair of connecting bolts 158, and the bolts 158 also being received in a slot 159 formed in each of the socket sections 156. When the bolts 158 are tightened the front pipe member 101 is rigidly secured to the associated tractor-carried brackets or hangers 151, and by loosening and removing the bolts 158, the front pipe member 101 and associated drawbars may be disconnected from the tractor after backing the latter a small amount, as necessary to permit the pipe 101 to drop out of the arcuate sockets in the socket members 156.

It was mentioned above that the laterally inner seed and fertilizer hoppers are supported directly on the main frame component 26 by any suitable means, such as the brackets 93. The laterally outer seed and fertilizer hoppers are supported on the laterally outer end portions of the transverse lifting pipe member 66 through the pair of outer hopper supports 31. Referring now to Figs. 1 and 4, each of the outer hopper supports or braces 31 comprises a pipe member having an arcuate attaching section 161 at its forward end apertured to receive a bolt 162 (Fig. 1) carried at the outer end of the transverse front pipe member 101. The attaching section 161 is arcuate so as to fit snugly against the pipe member 101. At its rear end, each of the outer hopper supports 31 is provided with a transverse sleeve section 163 dimensioned to snugly pass over the associated laterally outer end of the transverse lifting pipe member 66, and each sleeve section 163 is provided with associated bracket means 164 to receive the seed and fertilizer hoppers and associated parts, such as the laterally outer end of the associated drive shaft 89 and other driving and seed-dispensing means. When raising and lowering the furrow openers by rocking the pipe member 66, the latter member turns within the sleeves 163 at the rear ends of the right- and left-hand outer hopper support members 31.

Each of the outer hopper support members 31 is held in place by latch means that is best shown in Fig. 5. The latch means is indicated in its entirety by the reference numeral 167 and comprises a detent member 168 slidably carried on a pin 169 secured, as by welding, within the laterally outer end of the pipe 66, there being a pin 169 in each end of the pipe 66. A spring 171 is disposed about each pin 169 and acts against the detent 168 to urge the latter outwardly in a position to prevent the associated sleeves 163 from becoming disconnected from the supporting pipe member 66. The sleeve 163 is prevented from becoming displaced laterally inwardly by virtue of its contact with the adjacent lifting arm 79, as will best be understood from Fig. 1.

In operation, the runner openers are raised and lowered by rocking the pipe member 66 about a transverse axis, thus raising and lowering the front ends of the several lifting arms 79.

Fig. 1 shows the implement mounted in operating position on the tractor. When it is desired to disconnect the implement from the tractor, so as to free the latter for other uses, the first step is to remove both the right and left outside hopper support members 31, which can be done readily by removing the attaching bolts 162, depressing the latch lugs 168 and slipping the sleeves 163 laterally outwardly, which automatically disconnects the telescopic drive shafts 86 and 88. Before disconnecting the outside hoppers it is, of course, necessary to disconnect the upper ends of the laterally outer seed and fertilizer tubes 36 and 37. Next, the bolts 158 are removed and the front pipe 101 released from the socket members 156, after all lifting links 148 and springs 149 are disconnected from the associated left arms 79. The tractor, carrying the main frame unit 26 and associated parts, may then be driven forwardly across the pipe 101 which now rests on the ground. The three stands 55 are then lowered until the base of each rests on the ground, after which associated set screws may be tightened (one of the set screws is indicated at 200 in Fig. 2), and then by removing the studs 57 the nuts from the studs 48 and the drive chains from the sprockets 82, the tractor may be driven forwardly leaving the main frame unit 26 resting on the stands 53, 55.

In attaching the planter to the tractor, substantially the reverse of the above-described operations takes place. In re-connecting, the first step is to back the tractor into position relative to the main frame unit 26, this operation being facilitated by the flared portions 61 on the attaching member 58 that are fixed to the forward sides of the rear axle housings.

Figure 6:
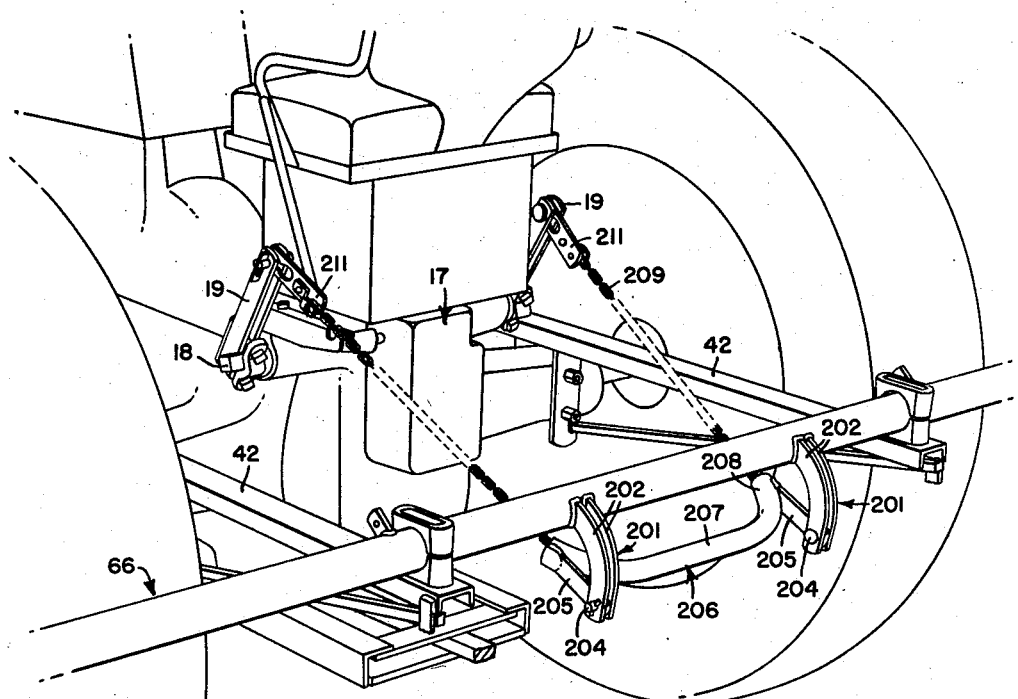
Fig. 6 is a fragmentary perspective view, similar to Fig. 2, showing a modified arrangement of the means for rocking the main transverse rockshaft.

Fig. 6 shows a modified arrangement for connecting the main transverse pipe or rockshaft 66 with the lift arms 19 of the tractor power unit 17. In this form of the invention the rockshaft 66 carries, between the supporting frame channels 42, a pair of rearwardly and downwardly extending arms 201, each being made up of a pair of arcuate straps 202 secured at their upper ends, as by welding, to the pipe member 66. The lower ends of the straps 202 apertured to receive a cross pin 204 by which the arms 205 of the yoke member 206 are pivotally connected to the arms 201. The yoke 206 comprises, in addition to the arms 205, a U-shaped pipe member 207 having end sections 208 that are curved forwardly, the arms 205 being welded at their forward ends to the forward portion of the pipe sections 208. A lifting chain 75 passes through the pipe member 207 and is connected at its ends, as by link members 211 with the outer ends of the lift arms 19.

The curved portions 208 of the pipe or tube 207 provide a smooth passageway for the equalizing chain 209 whereby the effort of rocking the transverse pipe or rockshaft 66 is divided equally between the lift arms 19, whereby excessive torsional strains in the power lift rockshaft 18 are substantially eliminated.

While we have shown and described above the preferred structure in which the principles of the present invention have been incorporated, it is to be understood that our invention is not to be limited to the particular details, shown and described above but that, in fact, widely different means may be employed in the practice of the broader aspects of our invention.

What we claim, therefore, and desire to secure by Letters Patent is:

1. In an agricultural implement, the combination with a tractor having power lift means including a rockshaft and a pair of lift arms connected at the ends of the rockshaft, of an implement comprising frame means, means to rigidly mount said frame means at laterally spaced apart points on the rear portion of said tractor, to extend rearwardly therefrom, a transverse rockshaft supported for rocking movement on the rear portion of said frame means, a pair of arms fixed in laterally spaced relation to said rockshaft, a tubular yoke member connected adjacent its ends with said latter arms, a lift chain mounted for sliding movement within said yoke member and adapted to be connected at its ends with said power lift arms, and tool means movable relative to said frame means and connected with said rockshaft to be raised and lowered by rocking movement thereof.

2. In an agricultural implement, the combination with a tractor having a rear axle structure, including laterally outwardly extending axle housings, and power lift means including generally vertically swingable lift arms, of an implement comprising frame means including a pair of laterally spaced apart fore-and-aft extending members, means at the forward ends of said members to fix them to said axle housings, a transverse rockshaft rockably mounted on the rear portions of said frame members, furrow opener units connected with said rockshaft to be raised thereby, a pair of laterally spaced apart arms fixed to said transverse rockshaft, between said frame members, a transverse tubular part pivotally connected adjacent its ends to said arms, a flexible element slidably disposed within said tubular part and extending outwardly and forwardly from the ends of said tubular part to said lift arms and means connecting the ends of said flexible element with said lift arms whereby the lifting effort of raising said furrow-opening units is distributed substantially equally between said lifting arms.

References Cited in the file of this patent
UNITED STATES PATENTS

| | | |
|---|---|---|
| 1,727,175 | Newman | Sept. 3, 1929 |
| 2,341,147 | Kriegbaum | Feb. 8, 1944 |
| 2,351,078 | Silver | June 13, 1944 |
| 2,620,716 | Ciancio | Dec. 9, 1952 |

FOREIGN PATENTS

| | | |
|---|---|---|
| 132,975 | Australia | June 1, 1949 |